(12) United States Patent
Kishimoto et al.

(10) Patent No.: US 7,345,961 B2
(45) Date of Patent: Mar. 18, 2008

(54) INFORMATION MEDIUM APPARATUS AND INFORMATION MEDIUM STARTING METHOD

(75) Inventors: Takashi Kishimoto, Nara (JP); Rie Takahashi, Osaka (JP); Katsuya Watanabe, Nara (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 705 days.

(21) Appl. No.: 10/972,215

(22) Filed: Oct. 22, 2004

(65) Prior Publication Data

US 2005/0117465 A1  Jun. 2, 2005

(30) Foreign Application Priority Data

Oct. 23, 2003 (JP) ............................. 2003-363060

(51) Int. Cl.
*G11B 7/085* (2006.01)
(52) U.S. Cl. .............................. 369/30.27; 369/53.25
(58) Field of Classification Search ............. 369/30.27, 369/30.28, 30.29, 53.25, 53.26, 53.27, 53.22, 369/53.2, 53.23, 44.27, 44.29
See application file for complete search history.

(56) References Cited

U.S. PATENT DOCUMENTS 5,745,451 A * 4/1998 Mukawa et al. .......... 369/44.29
5,831,952 A    11/1998 Yamada et al.
6,295,260 B1    9/2001 Shihara et al.

FOREIGN PATENT DOCUMENTS

| EP | 0 500 271 A2 | 8/1992 |
| EP | 0 744 743 A2 | 11/1996 |
| EP | 0 751 513 A2 | 1/1997 |
| EP | 0 896 331 A1 | 2/1999 |
| JP | 2000-90440 | 3/2000 |

OTHER PUBLICATIONS

European Search Report for corresponding Application No. 04 02 5304 dated Aug. 16, 2006.

* cited by examiner

*Primary Examiner*—Ali Neyzari
(74) *Attorney, Agent, or Firm*—Renner, Otto, Boisselle & Sklar, LLP

(57) ABSTRACT

An information medium apparatus for performing at least one of a recording operation and a reproduction operation for the information medium, includes: a determination section for determining whether or not a cartridge for accommodating the information medium has been previously opened; and a control section for performing a start processing procedure corresponding to the information medium. When it is determined that the cartridge has not been previously opened, the control section performs a first start processing procedure for starting the information medium by using a blue laser. When it is determined that the cartridge has been previously opened, the control section determines whether or not the information medium is an information medium for which a start processing procedure is to be performed by using a laser other than the blue laser.

40 Claims, 6 Drawing Sheets

(a) Single layer disc (b) Dual layer disc (a) Blu-ray single layer disc (b) Reversely mounted disc (high reflectivity)

INFORMATION MEDIUM APPARATUS AND INFORMATION MEDIUM STARTING METHOD

BACKGROUND OF THE INVENTION

1. Field of the Invention

The present invention relates to an information medium apparatus and an information medium starting method for recording or reproducing information on or from an information medium by using a light beam from a light source such as a laser. Particularly, this invention relates to an information medium apparatus and an information medium starting method for selecting one light source from a plurality of light sources such as a blue laser, a red laser and an infrared laser, and performing an start processing procedure corresponding to the selected light source.

2. Description of the Related Art

Conventionally, a method described in Japanese Laid-Open Publication No. 2000-90440 is known as a method for determining a type of an optical disc. In this method, a lens is moved between a position where the lens is closest to the optical disc and a position where the lens is sufficiently far from the optical disc. During the movement process, it is determined whether or not there is light reflecting from a surface of the optical disc, and whether or not there is light reflecting from a signal surface of the optical disc. In this way, the type of the optical disc is determined. In this method, the position where the lens is closest to the optical disc is a position where the lens is in contact with the optical disc.

However, the optical disc apparatus described in Japanese Laid-Open Publication No. 2000-90440 has the following problem. Since the closest position is the position where the lens is in contact with the optical disc, the lens and the optical disc bump into one another when the lens is moved between the position where the lens is closest to the optical disc and the position where the lens is sufficiently far from the optical disc, although the bumping is marginal. Thus, an optical disc may be damaged in the worst case and it may become impossible to be record or reproduce information to or from the optical disc. Furthermore, when a blue laser is used to irradiate an existing optical disc, which is recorded or reproduced by using a red laser or infrared laser, such as a DVD disc or a CD disc, recorded data may be destroyed.

SUMMARY OF THE INVENTION

According to one aspect of the present invention, there is provided an information medium apparatus for performing at least one of a recording operation and a reproduction operation for the information medium, including: a determination section for determining whether or not a cartridge for accommodating the information medium has been previously opened; and a control section for performing a start processing procedure corresponding to the information medium, wherein: when it is determined that the cartridge has not been previously opened, the control section performs a first start processing procedure for starting the information medium by using a blue laser, and when it is determined that the cartridge has been previously opened, the control section determines whether or not the information medium is an information medium for which a start processing procedure is to be performed by using a laser other than the blue laser.

According to another aspect of the present invention, there is provided an information medium starting method which is performed in an information medium apparatus for performing at least one of a recording operation and a reproduction operation for the information medium, including the steps of: (a) determining whether or not a cartridge for accommodating the information medium has been previously opened; and (b) performing a start processing procedure corresponding to the information medium, wherein the step (b) includes the steps of: when it is determined that the cartridge has not been previously opened, performing a first start processing procedure for starting the information medium by using a blue laser; and when it is determined that the cartridge has been previously opened, determining whether or not the information medium is an information medium for which a start processing procedure is to be performed by using a laser other than the blue laser.

Thus, the invention described herein makes possible the advantages of providing an information medium apparatus and an information medium starting method which can avoid scratching an optical disc or destroying data because an existing optical disc which is recorded or reproduced by using a red laser or an infrared laser, such as a DVD disc or a CD disc, is irradiated with a blue laser and it is not necessary to bring a lens into contact with the optical disc for determining the type of the optical disc, and also allows for determination of the type of the optical disc at a high reliability, and a start processing procedure for an optical disc can be performed at a high speed by using a cartridge switch.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described in detail with reference to the drawings.

Embodiment 1

Figure 1:
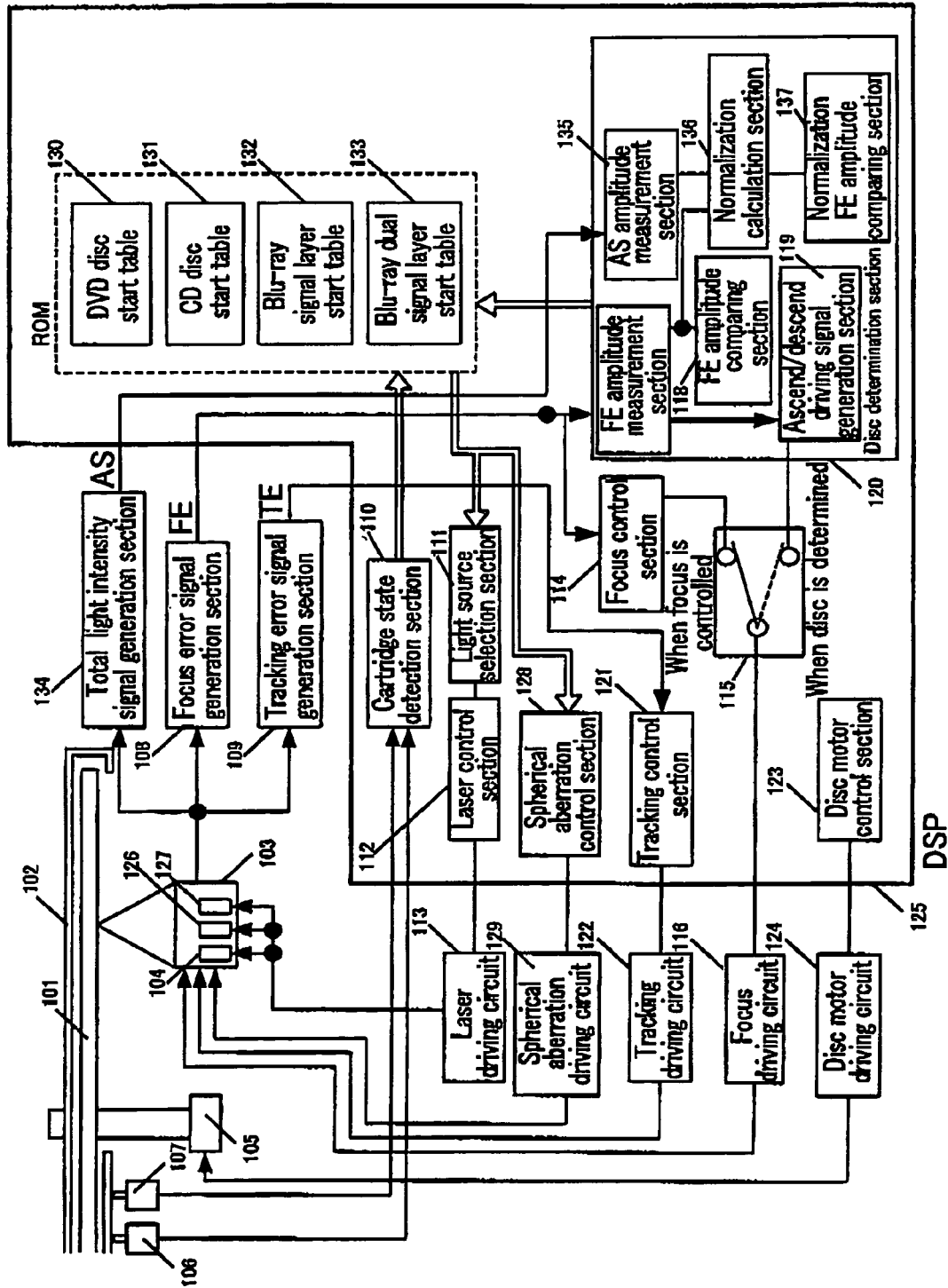
FIG. 1 is a block diagram showing a structure of an optical disc apparatus according to Embodiment 1 of the present invention.

FIG. 1 is a block diagram showing a structure of an optical disc apparatus according to Embodiment 1 of the present invention.

The optical disc apparatus according to the present invention includes: a disc motor control section 123 for rotating an optical disc 101 accommodated in a cartridge 102 at a predetermined rotation rate. a disc motor driving circuit 124;

a disc motor 105; an optical head 103 for reproducing information from the optical disc 101; and a traverse motor (not shown) for moving the entire optical head 103 in a direction perpendicular to the direction of the track of the optical disc 101. The disc motor control section 123 is provided in a digital signal processor (DSP) 125.

The optical head 103 includes: a blue laser light source 104 such as a semiconductor laser; a red laser light source 126; an infrared laser light source 127; a coupling lens; a spherical aberration correction lens; a polarizing beam splitter; a polarizer; a converging lens; a splitting mirror; and a photo disc. In FIG. 1, among the components of the optical head 103, components other than the light sources 104, 126, and 127 are not shown.

The optical head 103 outputs a light beam from one of the blue laser light source 104, the red laser light source 126, and the infrared laser light source 127. A light source selection section 111 selects one of the three light sources. A laser control section 112 and a laser driving circuit 113 adjust the laser power of the selected light source to a predetermined laser power. The light source selection section 111 and the laser control section 112 are provided in the DSP 125.

The light beam output from the optical head 103 is collimated by a coupling lens. Then, the light beam passes through the spherical aberration correction lens and is then reflected by a polarizing beam splitter. The light beam passes though the polarizer and is then converged on a surface of the optical disc 101 by the converging lens.

The spherical aberration correction lens is driven by the spherical aberration correction control section 128 and the spherical aberration correction driving circuit 129. These can correct spherical aberration which is generated due to a difference in the thicknesses of the member of the optical disc 101. The spherical aberration correction control section 128 is provided in the DSP 125.

In this way, a light beam spot is formed so as to have a focal point in a thickness direction of the optical disc 101 which is rotated by the disc motor 105.

The light reflected by the optical disc 101 passes through the converging lens, the polarizer, the polarizing beam splitter, and a collective lens, and is then split into light beams in two directions by the splitting mirror.

One of the light beams in two directions which are split by the splitting mirror is input to a focus control device via a photo detector having a quarter-split structure in the optical head 103.

The focus control device includes a focus error signal generation section 108, the DSP 125, a focus driving circuit 116, and a focus actuator (not shown).

The focus error signal generation section 108 includes a first addition section (not shown), a second addition section (not shown), and a differential amplifier (not shown).

The first addition section adds two output signals from two diagonally positioned light-receiving sections, among the four output signals from the photo detector having a quarter-split structure in the optical head 103.

The second addition section adds two other output signals, among the four output signals.

The differential amplifier generates a focus error signal (FE signal) based on a difference between the output signal from the first addition section and the output signal from the second addition section.

The FE signal indicates a positional shift between a convergence point of the light beam and an information surface of the optical disc 101. Such a method for detecting a FE signal is called the "astigmatism method". The FE signal is input to the DSP 125.

The DSP 125 is provided with a switch 115. The switch 115 is set to a position indicated by a solid line in FIG. 1 when the focus control is necessary.

The FE signal input to the DSP 125 is input to a focus control section 114. The focus control section 114 includes: an AD converter (not shown); an adder for compensating a phase of a focus control system; a compensation filter (not shown) which is a digital filter composed of a multiplier and a delay; a switching circuit (not shown) for switching a loop gain of the focus control system; and a DA converter (not shown). The output signal of the focus control section 114 is input to the focus driving circuit 116 via the switch 115. The focus driving circuit 116 performs a current amplification of an output signal from the DSP 125 and converts the level to drive a focus actuator. The focus actuator is driven such that the light beam on the optical disc 101 is always in a predetermined convergence state. As a result, the focus control is implemented.

A total light intensity signal generation section 134 includes an addition section (not shown) for adding the four output signals from the photo detector having the quarter-split structure in the optical head 103 so as to generate a total light intensity signal (AS signal). The AS signal is input to the DSP 125.

The other of the light beams in two directions which are split by a splitting mirror is input to a tracking control device via the photo detector having a quarter-split structure in the optical head 103.

The tracking control device includes a tracking error signal generation section 109, the DSP 125, a tracking driving circuit 122, and a tracking actuator (not shown).

The tracking error signal generation section 109 includes a first addition section (not shown), a second addition section (not shown), and a subtractor (not shown).

The first addition section adds two output signals from two light-receiving sections positioned along an inner periphery with respect to the track, among the four output signals from the photo detector having a quarter-split structure in the optical head 103.

The second addition section adds two output signals from two light-receiving sections positioned along an outer periphery with respect to the track, among the four output signals from the photo detector having a quarter-split structure in the optical head 103.

The subtractor subtracts the output signal from the second addition section from the output signal from the first addition section so as to generate a tracking error signal (TE signal).

The TE signal indicates a positional shift between a convergence point of the light beam and the track to be scanned. Such a method for detecting a TE signal is called a "push-pull method". The TE signal is input to the DSP 125.

The TE signal input to the DSP 125 is input to the tracking control section 121. The tracking control section 121 includes: an AD converter (not shown); an adder for compensating a phase of a tracking control system; a compensation filter (not shown) which is a digital filter composed of a multiplier and a delay; a switching circuit (not shown) for switching a loop gain of the tracking control system; and a DA converter (not shown). The output signal of the tracking control section 121 is input to the tracking driving circuit 122. The tracking driving circuit 122 performs a current amplification of an output signal from the DSP 125 and converts the level to drive the tracking actuator. The tracking actuator is driven such that the convergence point of the light beam on the optical disc 101 scans a predetermined track. As a result, the tracking control is implemented.

At the same time tracking control is being performed, transfer control is performed for driving a traverse motor such that the convergence point of the light beam and the center of the converging lens match (i.e., an optical axis of the light beam applied to the optical disc 101 and the optical axis of the converging lens). However, the description of the transfer control is omitted herein.

Figure 2:
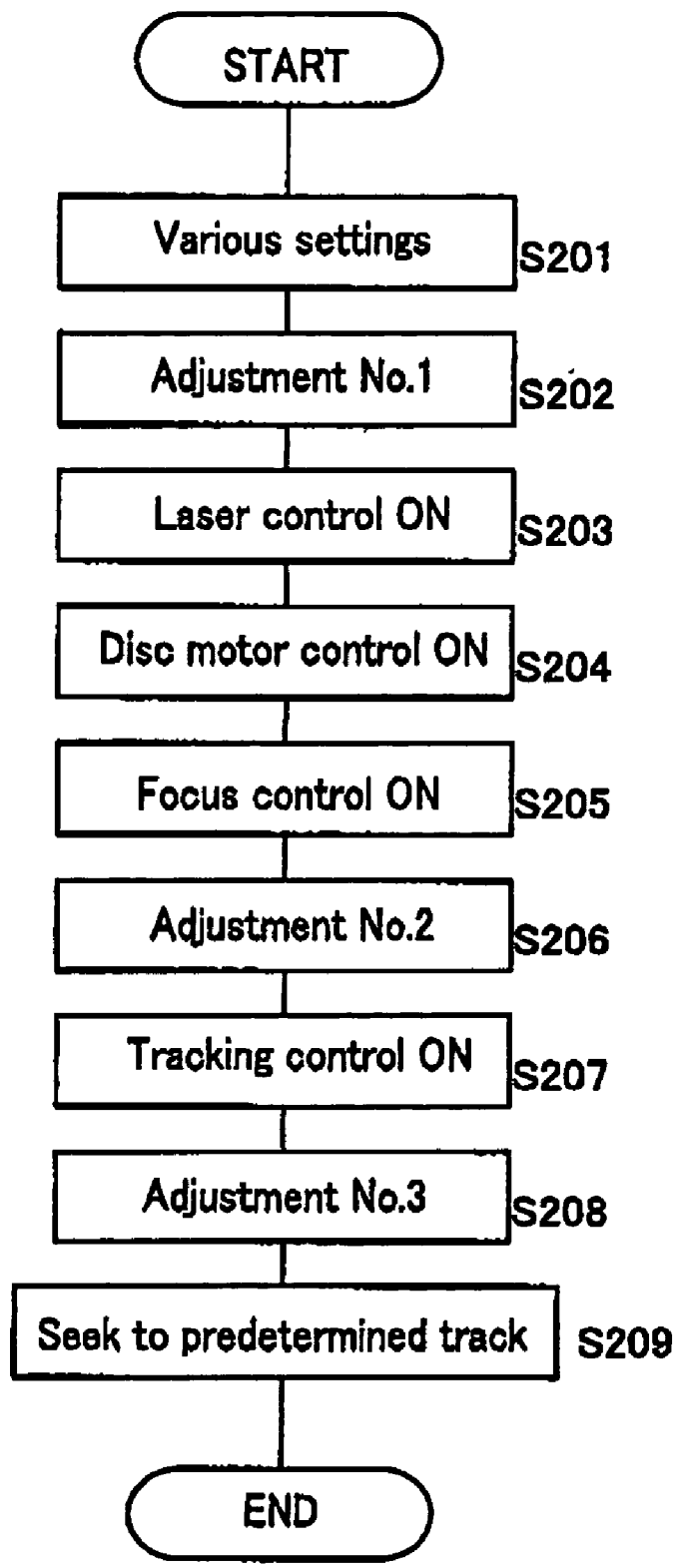
FIG. 2 is a flow chart showing start processing procedure for an optical disc mounted on the optical disc apparatus when the type of the optical disc is known.

Hereinafter, with reference to FIGS. 1 and 2, a start processing procedure for the optical disc 101 will be described in the case where the type of the optical disc 101 mounted on the optical disc apparatus is already known.

In step S201, a light source, laser power, a spherical aberration correction amount, a gain of the focus error signal error generation section 108, a gain of the tracking error signal generation section 109, and the like are set in accordance with the type of the optical disc 101.

In step S202, offsets of the focus control system, the tracking control system and the like are adjusted.

In step S203, the desired laser control is turned on. For example, when the optical disc 101 mounted to the optical disc apparatus is a DVD disc, control for the red laser is turned on. When the optical disc 101 is a CD disc, control for the infrared laser is turned on. When the optical disc 101 is a Blu-ray disc, control for the blue laser is turned on.

In step S204, the disc motor control is turned on. As a result, the disc motor driving circuit 124 controls the disc motor 105 such that it rotates the optical disc 101 at a predetermined rotation rate.

In step S205, the focus control is started.

In step S206, various adjustments (e.g. a focus position coarse adjustment and a tracking position (symmetry) adjustment) is performed in the case where the focus control is in the on-state and the tracking control is in the off-state.

In step S207, the tracking control is started.

In step S208, various adjustments (e.g. a loop gain adjustment for the focus control system and the tracking control system and a focus position precise adjustment) is performed in the case where the tracking control is in the on-state.

In step S209, a seek to the predetermined track is performed in order to enter a waiting state for the next processing at the predetermined track. The start processing procedure is then completed. Then, a reproduction operation or a recording operation for the optical disc 101 is performed as necessary.

In the case where the optical disc 101 mounted to the optical disc apparatus includes a plurality of information surfaces (layers), a focus jump operation for moving the convergence point of the light beam from the information surface on which the focus control is currently performed to an adjacent information surface is performed after step S208. Various adjustments are performed in steps S206 and S208 such that the best recording or reproduction operation for the information surface is achieved.

Hereinafter, with reference to FIGS. 1 and 3, a start processing procedure for the optical disc 101 will be described in the case where the type of the optical disc 101 mounted on the optical disc apparatus is unknown.

The cartridge 102 accommodating the optical disc 101 includes hole 1 and hole 2 at predetermined positions. The predetermined positions are defined by, for example, standards. Hole 1 is used for determining whether or not the cartridge 102 has been previously opened. Hole 2 is used for determining whether the optical disc 101 accommodated in the cartridge 102 is a single layer disc or a dual layer disc.

Initially, hole 1 is closed. When the cartridge 102 is opened for removing the optical disc 101 accommodated in the cartridge 102, hole 1 is opened. The change of hole 1 from the closed state to the opened state is irreversible once the closed hole is opened, hole 1 cannot recover its original state (i.e., closed state).

For detecting the state of hole 1 (i.e., the closed state or the opened state), the optical disc apparatus includes a switch 106. By determining whether the switch 106 is turned on or off, it can be determined whether or not the cartridge 102 has been previously opened. Specifically, when the cartridge 102 has not been previously opened, hole 1 is closed. Thus, the switch 106 is turned on. When the cartridge 102 has been previously opened, hole 1 is opened. Thus, the switch 106 is turned off.

When a single layer disc is accommodated in the cartridge 102, hole 2 is closed. When a dual layer disc is accommodated in the cartridge 102, hole 2 is opened.

For detecting the state of hole 2 (i.e., the closed state or the opened state), the optical disc apparatus includes a switch 107. By determining whether the switch 107 is turned on or off, whether the optical disc 101 accommodated in the cartridge 102 is a single layer disc or a dual layer can be determined. Specifically, when the optical disc 101 accommodated in the cartridge 102 is a single layer disc, hole 2 is closed. Thus, the switch 107 is turned on. When the optical disc 101 accommodated in the cartridge 102 is a dual layer, hole 2 is opened. Thus, the switch 107 is turned off.

The switches 106 and 107 may be implemented by any method. For example, a photodiode and a photo detector may be used for implementing the switches 106 and 107 as optical switches. Alternatively, the switches 106 and 107 may be implemented as mechanical switches.

Outputs from the switches 106 and 107 are input to a cartridge state detection section 110. The cartridge state detection section 110 detects the states of hole 1 and hole 2 provided in the cartridge 102 and switches the start processing procedure of the optical disc 101 (e.g. a light source to be used, a spherical aberration correction amount, and the like) in accordance with the detected states.

In an example shown in FIG. 1, a ROM in the DSP 125 stores: a DVD disc start table 130 for a DVD disc; a CD disc start table 131 for a CD disc; a Blu-ray single layer disc start table 132 for a Blu-ray single layer disc; and a Blu-ray dual layer disc start table 133 for a Blu-ray dual layer disc. The cartridge state detection section 110 selects one of the four start tables to apply to the start processing procedure for the optical disc 101.

Figure 3:
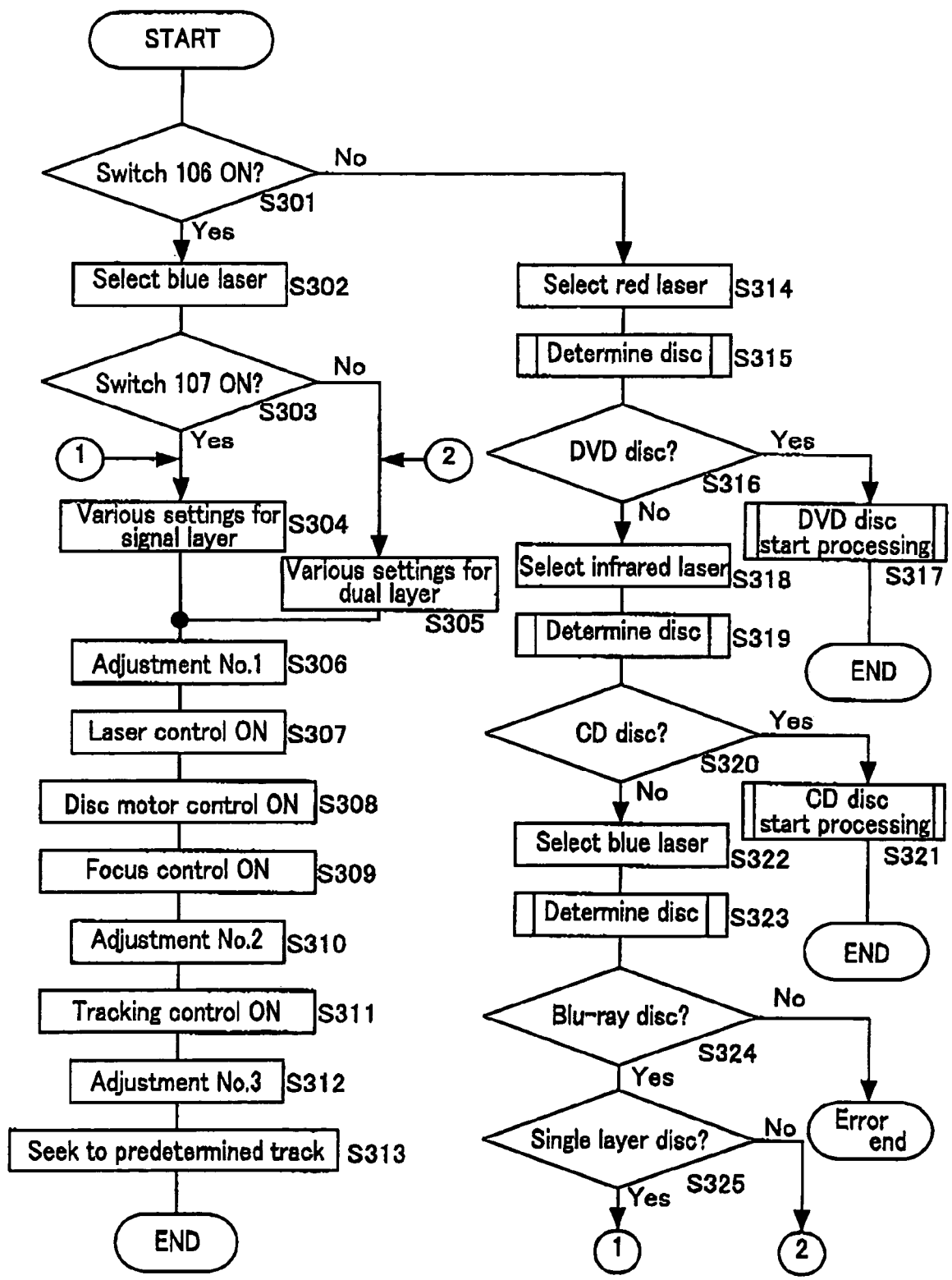
FIG. 3 is a flow chart showing start processing procedure for an optical disc mounted on the optical disc apparatus when the type of the optical disc is unknown.

With reference to FIG. 3, a start processing procedure for the optical disc 101 will be described.

In step S301, it is determined whether the switch 106 is turned on or off. Such a determination is performed by the cartridge state detection section 110.

When it is determined that the switch 106 is turned on, the cartridge 102 has not been previously opened. This means that the optical disc 101 accommodated in the cartridge 102 should be a Blu-ray disc. Thus, when it is determined that the switch 106 is turned on (i.e. it is determined that the cartridge 102 has not been previously opened), a blue laser is selected to perform a first start processing procedure for starting a Blu-ray disc (steps S302 to S313).

In step S302, the blue laser is selected. Such a selection is achieved by the light source selection section 111 selecting the blue laser light source 104. The reason why the blue laser is selected is that a recording operation and a reproduction operation for a Blu-ray disc are performed using a blue laser.

In step S303, it is determined whether the switch 107 is turned on or off. Such a determination is performed by the cartridge state detection section 110.

When it is determined that the switch 107 is turned on, the Blu-ray disc accommodated in the cartridge 102 is a single layer disc. Thus, in step S304, the Blu-ray single layer disc start table is selected, and laser power for a single layer, a spherical aberration correction amount, and/or gains of the focus error signal error generation section 108 and the tracking error signal generation section 109 are set.

When it is determined that the switch 107 is turned off, the Blu-ray disc accommodated in the cartridge 102 is a dual layer disc. Thus, in step S305, the Blu-ray dual layer disc start table 133 is selected, and various settings for a dual layer disc are set.

Instead of or in addition to a dual layer disc, a start processing procedure for the optical disc 101 having the structure of three layers or more may be performed. In this case the number of the plurality of layers of the optical disc 101 can be determined in accordance with the combination of the opened/closed states of a plurality of holes provided in the cartridge 102 (e.g. three holes such as hole 1, hole 2 and hole 3).

In step S306, offsets of the focus control system, the tracking system and the like are adjusted. In step S307, the control of the blue laser is turned on. In step S308, the disc motor control is turned on. As a result, a disc motor driving circuit 124 controls the disc motor 105 such that it rotates the optical disc 101 at a predetermined rotation rate.

In step S309, the focus control is started. In step S310, various adjustments (e.g. a focus position coarse adjustment and a tracking position (symmetry) adjustment) are performed in the case where the focus control is in the on-state and the tracking control is in the off-state. In step S311, the tracking control is started. In step S312, various adjustments (e.g. a loop gain adjustment for the focus control system and the tracking control system and a focus position precise adjustment) is performed in the case where the tracking control is in the on-state.

In step S313, a seek to the predetermined track is performed in order to enter a waiting state for the next processing at the predetermined track. The start processing procedure is then completed. Then, a reproduction operation or a recording operation for the optical disc 101 is performed as necessary.

When it is determined that the Blu-ray disc accommodated in the cartridge 102 is a dual layer disc in step S303, a focus jump operation for moving the convergence point of the light beam from the information surface on which the focus control is currently performed to an adjacent information surface is performed after step S312. Various adjustments are performed in steps S310 and S312 such that the best recording or reproduction operation for the information surface is achieved.

As described above, when it is determined that the cartridge 102 has not been previously opened, it is possible to immediately determine that the type of the optical disc 101 is a Blu-ray disc and to immediately perform a start processing procedure for a Blu-ray disc by using a blue laser. Thus, determination of the type of the optical disc can be performed at a high reliability and a start processing procedure for an optical disc can be performed at a high speed.

Further, by determining whether the switch 107 is turned on or off, it can be determined whether the Blu-ray disc is a single layer disc or a dual layer disc. In this case, it is not necessary to irradiate the Blu-ray disc with blue laser for determining whether the Blu-ray disc is a single layer or a dual layer. Thus, determination of the type of the optical disc can be performed at a high reliability and a start processing procedure for an optical disc can be performed at a high speed.

When it is determined that the switch 106 is off in step S301, then it can be deduced that the cartridge 102 has been previously opened. This means that the optical disc 101 accommodated in the cartridge 102 may be a disc other than the Blu-ray disc, such as a DVD disc, or a CD disc. Alternatively, the optical disc 101 accommodated in the cartridge 102 may be a Blu-ray disc but accommodated in a reverse way in the cartridge 102. Furthermore, even when the cartridge 102 is a cartridge for a single layer Blu-ray disc in which hole 2 is closed a dual layer Blu-ray disc may be accommodated in the cartridge 102.

If an existing optical disc which is recorded or reproduced by using a red laser or an infrared laser, such as a DVD disc or a CD disc, is irradiated with a blue laser, in the worst case, a recorded data may be destroyed. Thus, when it is determine that the cartridge 102 has been previously opened, it is determined if the optical disc 101 is a disc for which a start processing procedure is to be performed by using a laser other than the blue laser (steps S314 to S321).

In step S314, a red laser is selected. Such a selection is achieved by the light source selection section 111 selecting the red laser light source 126. The reason why the red laser is selected is that a recording operation and a reproduction operation for a DVD disc are performed using a red laser.

In step S315, a disc determination processing using the red laser is performed.

The FE signal which has been input to the DSP 125 is input to the focus control section 114 and also to the disc determination section 120. Further, the AS signal is also input to the disc determination section 120.

The disc determination section 120 includes: an FE amplitude measurement section 117 for measuring an amplitude of the input FE signal; an FE amplitude comparing section 118 for comparing the amplitude of the FE signal measured by the FE amplitude measurement section 117 with a predetermined value; an AS amplitude measurement section 135 for measuring an amplitude of the input AS signal; a normalization calculation section 136 for calculating the amplitude of the normalized FE signal which is obtained by normalizing the amplitude of the FE signal measured by the FE amplitude measurement section 117 with the amplitude of the AS signal measured by the AS amplitude measurement section 135; a normalization FE amplitude comparing section 137 for comparing the amplitude of the normalized FE signal calculated by the normalization calculation section 136 with a predetermined value; and an ascend/descend driving signal generation section 119 for generating a driving signal for moving the focus actuator vertically.

When the disc determination processing (S315) by using a red laser is performed, the switch 115 is set to the position indicated by the dotted line in FIG. 1. Thus, the output signal from the ascend/descend driving signal generation section 119 is input to the focus driving circuit 116 via the switch 115. The focus driving circuit 116 drives the focus actuator in accordance with the output signal from the ascend/descend driving signal generation section 119.

Next, with reference to FIG. 4, it will be described an operation of the disc determination section 120 (i.e. an amplitude measurement operation) in the disc determination processing (S315) by using a red laser.

Figure 4:
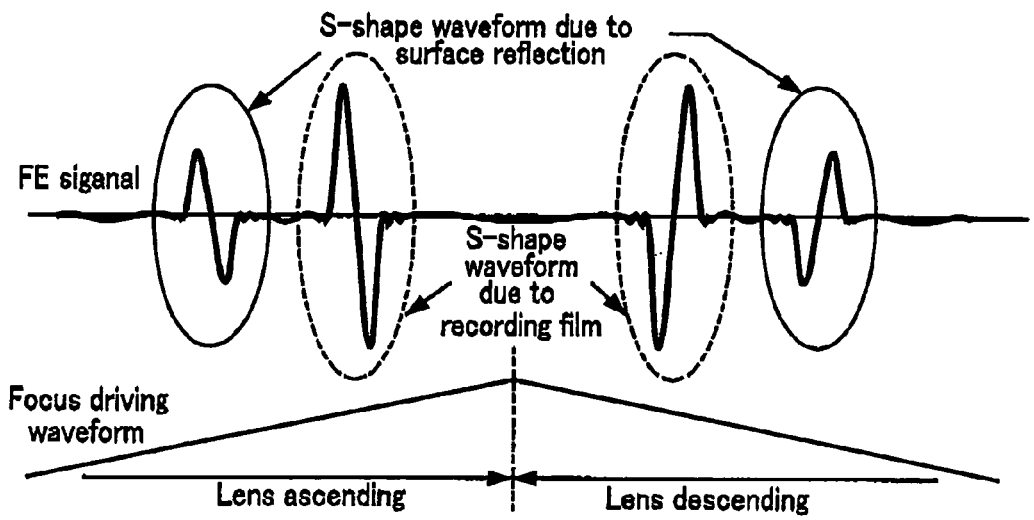
FIG. 4 is a diagram showing waveforms of the FE signal obtained by moving the focus actuator vertically.
Figure 4:
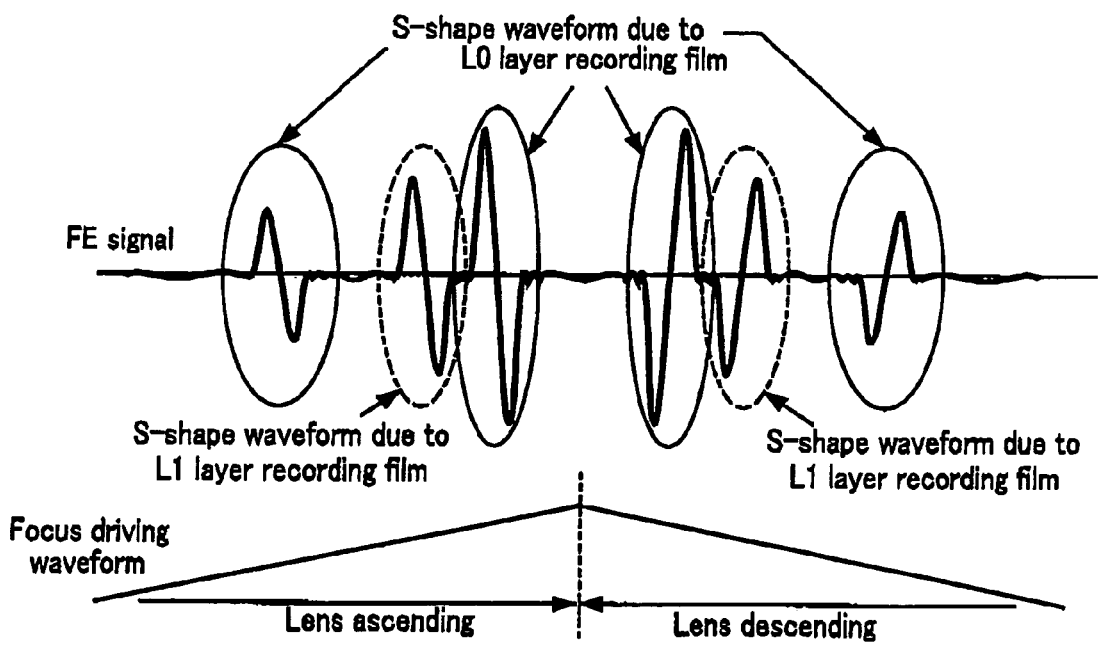

FIG. 4 shows waveforms of the FE signal obtained by moving the focus actuator vertically. Portion (a) of FIG. 4 shows an example of a single layer. Portion (b) of FIG. 4 shows an example of a dual layer.

When the focus actuator is moved up and down, waveforms having S-shapes appear in the FE signal near the surface or the information surface of the optical disc 101 due to the light reflected by the surface of the optical disc 101, or due to the light reflected by the information surface of the optical disc 101. The amplitudes of the S-shape waveforms are different due to the reflectivity and/or aberration of the optical disc 101. When the red laser is used, a DVD disc provides the largest amplitude. When the infrared laser is used, a CD disc provides the largest amplitude. When the blue laser is used, a Blu-ray disc provides the largest amplitude.

Further, an S-shaped amplitude of a single layer disc is greater than that of a dual layer disc, since the reflectivity of the single layer disc is greater than that of the dual layer disc.

During the amplitude measurement operation, the disc determination section 120 moves a convergence point of the light beam into a position which is away from the optical disc 101, then measures an amplitude of the FE signal while gradually moving the convergence point of the light beam close to the optical disc 101, and then moves the convergence point of the light beam away from the optical disc 101 after completing the measurement of the amplitude of the FE signal.

Such an amplitude measurement operation is achieved, for example, by the following operations. The ascend/descend driving signal generation section 119 outputs a driving signal in a descending direction so as to move the focus actuator (converging lens) from the position sufficiently remote from the optical disc 101. Then, the ascend/descend driving signal generation section 119 outputs a driving signal in a ascending direction such that the convergence point of the light beam is gradually moved close to the optical disc 101. The FE amplitude measurement section 117 starts the measurement of the amplitude of the FE signal and updates the minimum value and the maximum value of the measured FE signal.

As the focus actuator (converging lens) ascends, S-shape waveforms appear in the FE signal. The FE amplitude measurement section 117 measures the amplitude of the S-shape waveform. Herein, after the S-shape waveform due to light reflected by the information surface for the case where the optical disc is a single layer disc appears, or after the S-shape waveform due to light reflected by the information surface further from the optical head 103 in the case where the optical disc is a dual layer disc appears, the value measured in the FE amplitude measurement section 117 is not updated. Thus, if the value measured in the FE amplitude measurement section 117 is not updated for a certain period of time, the ascend/descend driving signal generation section 119 stops outputting the driving signal in the ascending direction, and starts outputting the driving signal in a descending direction.

By driving the focus actuator as such, it becomes possible to avoid the converging lens and the optical disc 101 from bumping into each other.

Further, by stopping the rotation of the optical disc 101 during measuring the amplitude of the FE signal, even if the bump occurs between the converging lens and optical disc 101, it is possible to reduce the influence of the bump on the optical disc 101. Such a control can be made, for example, by stopping the disc motor 105 while the ascend/descend driving signal generation section 119 outputs the driving signal.

In step S316, it is determined whether or not the optical disc 101 accommodated in the cartridge 102 is a DVD disc (i.e., a disc for which a start processing procedure is to be performed using a red laser).

When the amplitude of the FE signal measured by the FE amplitude measurement section 117 is greater than or equal to a predetermined value, the optical disc 101 is determined to be a DVD disc. In this case, the DVD disc start table 130 is selected in step S317, and a start processing procedure for a DVD disc is performed.

During the start processing procedure of the DVD disc, it is required to determine the type of the DVD disc (e.g. determine whether the DVD disc is DVD-ROM or DVD-RAM). However, a method for determining the type of the DVD disc and the start processing procedure according to the type of the DVD disc are known. Accordingly, the description thereof can be omitted.

When the amplitude of the FE signal measured by the FE amplitude measurement section 117 is smaller than the predetermined value, it is determined that the optical disc 101 is not a DVD disc (i.e., a disc other than any DVD disc). In this case, an infrared laser is selected in step S318, and a disc determination processing using the infrared laser is performed in step S319.

The operation of the disc determination section 120 (i.e. the amplitude measurement operation) in the disc determination processing (S319) using the infrared laser is the same as the operation of the disc determination section 120 (i.e. the amplitude measurement operation) in the disc determination processing (S315) using the red laser, except for using the infrared laser rather than the red laser. Accordingly, the description thereof can be omitted.

In step S320, it is determined whether or not the optical disc 101 accommodated in the cartridge 102 is a CD disc (i.e., a disc for which a start processing procedure is to be performed by using the infrared laser).

When the amplitude of the FE signal measured by the FE measurement section 117 is greater than or equal to a predetermined value, it is determined that the optical disc 101 is a CD disc. In this case, in step S321, the CD disc start table 131 is selected and a start processing procedure for a CD disc is performed.

During the start processing procedure of the CD disc, it is required to determine the type of the CD disc (e.g. determine whether the CD disc is CD-R or CD-RW). However, a method for determining the type of the CD disc and the start processing procedure according to the type of the CD disc are known. Accordingly, the description thereof can be omitted.

When it is determined that the optical disc 101 accommodated in the cartridge 102 is not a DVD disc and is not a CD disc (i.e. "No" in step S320), there is no possibility that the optical disc 101 accommodated in the cartridge 102 is the existing optical disc which should be recorded or reproduced by using the red laser or the infrared laser.

In step S322, blue laser is selected. Such a selection is achieved by the light source selection section 111 selecting the blue laser light source 104.

In step S323, a disc determination processing using the blue laser is performed. However, at this stage, there is still a possibility that the optical disc 101 accommodated in the cartridge 102 is a disc accommodated in the cartridge 102 in a reversed state. Accordingly, it is determined whether or not the optical disc 101 is accommodated in the cartridge 102 in the correct way in step 323.

The operation of the disc determination section 120 (i.e. the amplitude measurement operation) in the disc determination processing (S323) using the blue laser is the same as the operation of the disc determination section 120 (i.e. the amplitude measurement operation) in the disc determination processing (S315) using the red laser or the disc determination processing (S319) using the infrared laser, except for using the blue laser rather than the red laser or the infrared laser. Accordingly, the description thereof can be omitted.

In the disc determination processing (S323) using the blue laser, the amplitude of the AS signal is measured as well as the amplitude of the FE signal in order to determine whether or not the optical disc 101 is accommodated in the cartridge 102 in a reversed state.

Further, it is possible to stop the rotation of the optical disc 101 during measuring the amplitude of the FE signal and the amplitude of the AS signal. In this case, even if the bump occurs between the converging lens and optical disc 101, it is possible to reduce the influence of the bump on the optical disc 101.

If the optical disc 101 is accommodated in the cartridge 102 in the reversed state, the S-shape waveform of the FE signal due to a surface reflection from a label surface of the optical disc 100 and the waveform of the AS signal are detected. However, since the reflectivity of the label surface significantly varies depending on the type of the disc, it is impossible to distinguish the reversed disc from a Blu-ray disc based on only the amplitude of the FE signal.

Figure 6:
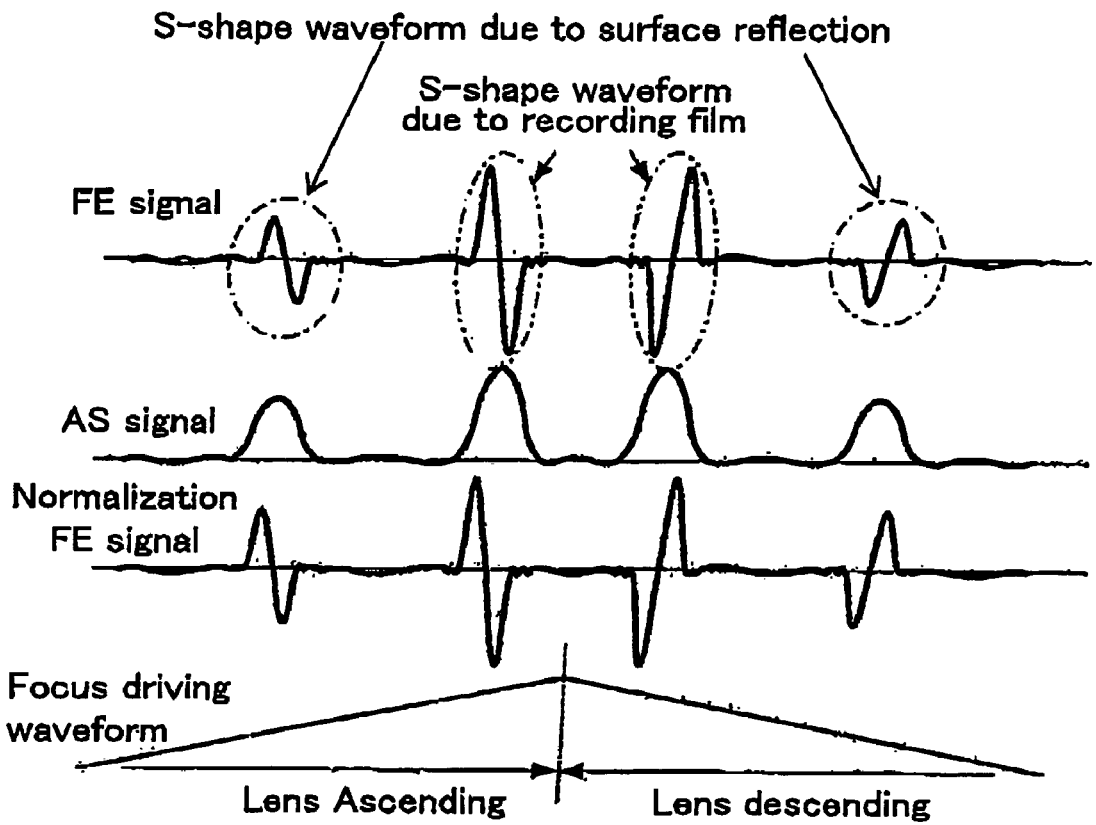
FIG. 6 is a diagram showing waveforms of the FE signal, the AS signal, and the FE signal normalized with the AS signal obtained by moving the focus actuator vertically.
Figure 6:
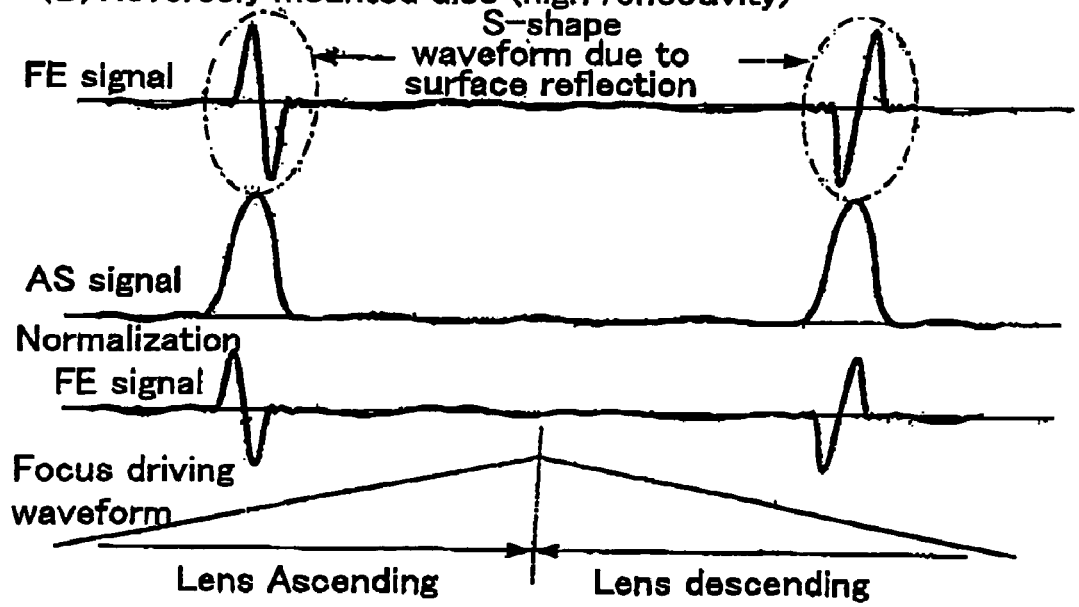

FIG. 6 shows waveforms of the FE signal, the AS signal, and the FE signal normalized with the AS signal. Portion (a) of FIG. 6 shows the case of the single layer Blu-ray disc. Portion (b) of FIG. 6 shows the case of the disc accommodated in the cartridge 102 in the reversed state.

An influence of a spherical aberration generated due to a difference in members of the optical disc 101 by using the blue laser is larger than that by using a laser other than the blue laser. When the spherical aberrations are shifted, degradation of the amplitude of the FE signal is larger than degradation of the amplitude of the AS signal compared to the case where the spherical aberrations are not shifted. In the case where the disc accommodated in the cartridge 102 is in the reversed state, the member thickness is shifted by about 0.1 mm compared to the case where a Blu-ray disc accommodated in the cartridge 102 is in the correct way. Thus, even though the amplitude of S-shape waveform due to the surface reflection is the same as the amplitude of the S-shape waveform due to a recording film of the Blu-ray disc, there is a difference in amplitudes of the normalized FE signals. Specifically, the amplitude of the normalized FE signal obtained when the disc accommodated in the cartridge 102 is in the reversed state becomes smaller than the amplitude of the normalized FE signal obtained when the Blu-ray disc is accommodated in the cartridge 102 in the correct way. This is because a difference between the reflectivity is absorbed and only the influence of the spherical aberration remains.

When the disc determination operation is performed using a Blu-ray disc if a single Blu-ray disc is irradiated with the blue laser at a laser power for a dual layer Blu-ray disc, recorded data may be destroyed (reproduction light degradation). Thus, all of the settings including the laser power are set to the settings for a single layer.

In step S324, if the amplitude of the normalized FE signal calculated by the normalization calculation section 136 is smaller than or equal to a predetermined value, the optical disc 101 accommodated in the cartridge 102 is determined to be a disc other than the Blu-ray disc. It is determined as "No" of step S324, when the optical disc 101 accommodated in the cartridge 102 is in the reverse state. In this case, the start processing procedure terminates with an error signal.

When it is determined as "Yes" in step S324, the Blu-ray disc is accommodated In the cartridge 102 in the correct way. Accordingly, a second start processing procedure (steps S325 or S304 to S313) by using the blue laser is performed for starting a Blu-ray disc.

In step S325, if the amplitude of the FE signal measured by the FE amplitude measurement section 117 is greater than or equal to a predetermined value, the optical disc 101 accommodated in the cartridge 102 is determined to be a single layer Blu-ray disc. In this case, step S304 and steps S306 to S313 are performed to complete the start processing procedure. Thereafter, a reproduction operation or a recording operation of the optical disc 101 is performed as necessary.

On the other hand, in step S325, if the amplitude of the FE signal measured by the FE amplitude measurement section 117 is smaller than or equal to the predetermined value, the optical disc 101 accommodated in the cartridge 102 is determined to be a dual layer Blu-ray disc. In this case, a focus jump operation is performed for moving the convergence point of the light beam from the information surface on which the focus control is currently performed to an adjacent information surface is performed after the processing from step S305 to step S313. Various adjustments are performed in steps S310 and S312 such that the best recording or reproduction operation for the information surface is achieved.

As described above, by temporarily selecting a laser other than the blue laser in the case where the cartridge has been previously opened, and performing the disc determination processing by using the amplitude of the FE signal, it becomes possible to perform the start processing procedure in accordance with the type of the disc without destroying the recorded data by irradiation of the blue laser even in the case where an existing optical disc which is recorded or reproduced by using a red laser or an infrared laser, such as a DVD disc or a CD disc, is accommodated in the cartridge 102. Furthermore, it is possible to avoid destroying the recorded data by irradiating a single layer disc at the laser power for a dual layer disc by setting all of the settings including a laser power to those for a single layer disc when the disc is determined to be a blue laser. It is also possible to determine whether or not the disc is accommodated in the cartridge 102 in the reversed state.

In the present embodiment, in the case where the cartridge 102 has been previously opened, the red laser is selected to determine whether or not the disc is a DVD disc, and then the infrared laser is selected to determine whether or not the disc is a CD disc. Similar effects can also be achieved by first selecting the infrared laser to determine whether or not the disc is a CD disc, and then selecting the red laser to determine whether or not the disc is a DVD disc.

Embodiment 2

Next, Embodiment 2 according to the present invention will be described. Embodiment 2 relates to a start processing procedure of a bare optical disc 101. Herein, a "bare optical disc" means that the optical disc is not accommodated in any cartridge.

The start processing procedure for the bare optical discs 101 may be implemented similar to the start processing procedure for the optical disc 101 when it is determined that the cartridge 102 has been previously opened as described with respect to the Embodiment 1.

Figure 5:
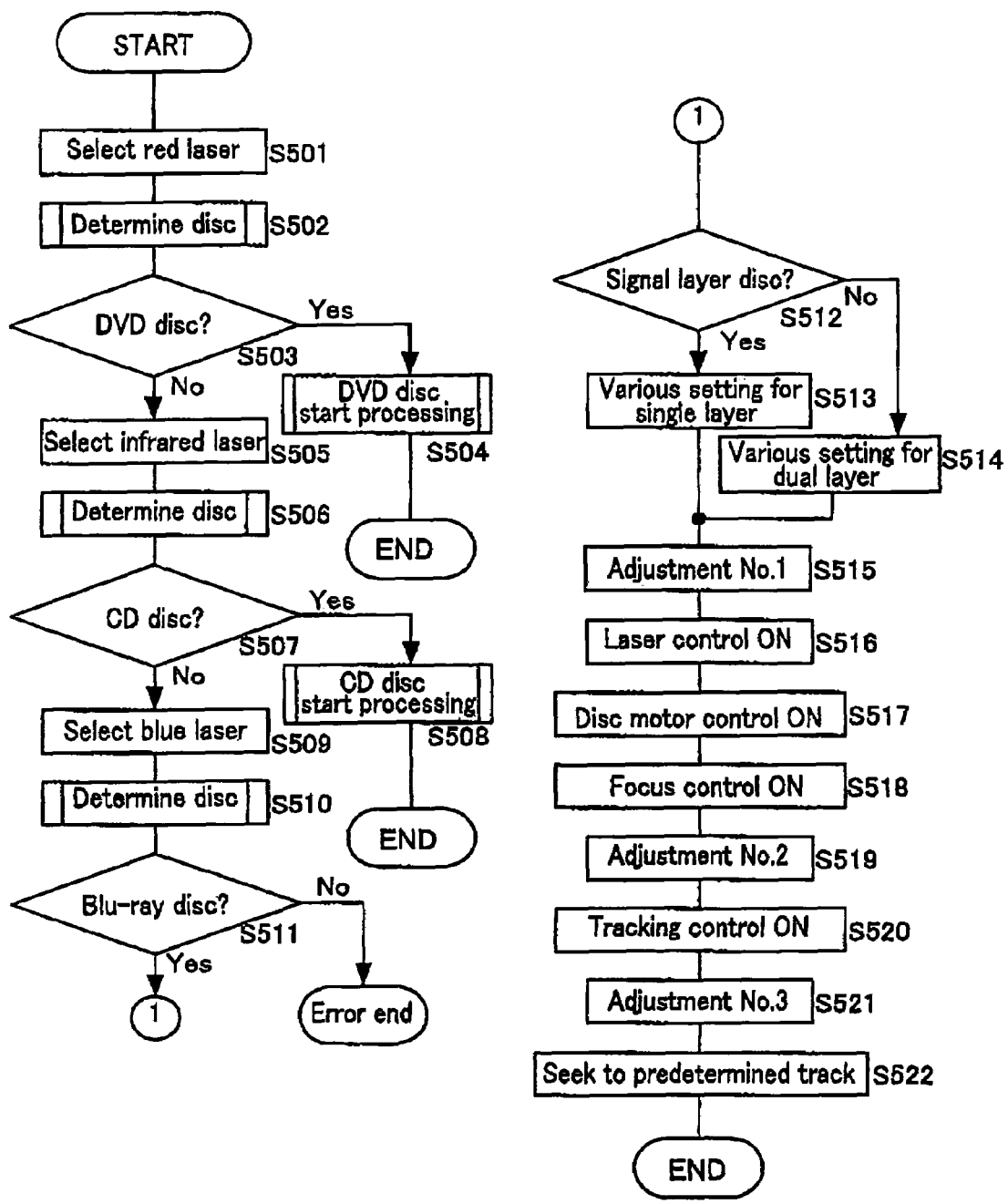
FIG. 5 is a flow chart showing start processing procedure for an optical disc mounted on the optical disc apparatus when the optical disc is a bare optical disc.

Hereinafter, with reference to FIGS. 1 and 5, the start processing procedure for the optical disc 101 when the optical disc 101 mounted to the optical disc apparatus is a bare optical disc will be described.

In step S501, a red laser is selected. Such a selection is achieved by the light source selection section 111 selecting the red laser light source 126. The reason why the red laser is selected is that it is highly probable that the bare optical disc 101 is a DVD disc or a CD disc.

In step S502, a disc determination processing using the red laser is performed. The method for measuring the amplitude of the FE signal including the vertical movement operation of the focus actuator is similar to that described in Embodiment 1, and thus, the description thereof is omitted.

In step S503, it is determined whether or not the optical disc 101 is a DVD disc (i.e., a disc for which a start processing procedure is to be performed using a red laser).

When the amplitude of the FE signal measured by the FE amplitude measurement section 117 is greater than or equal to a predetermined value, the optical disc 101 is determined to be a DVD disc. In this case, the DVD disc start table 130 is selected in step S504, and a start processing procedure for a DVD disc is performed. Herein, the start processing procedure of the DVD disc is substantially the same as that described in Embodiment 1, and thus the description thereof is omitted.

When the amplitude of the FE signal measured by the FE amplitude measurement section 117 is smaller than the predetermined value, it is determined that the optical disc 101 is not a DVD disc (i.e., a disc other than a DVD disc). In this case, an infrared laser is selected in step S505, and a disc determination processing using the infrared laser is performed in step S506. Herein, the method for measuring the amplitude of the FE signal including the vertical moving operation of the focus actuator is similar to that by the red laser described above, and thus, the description thereof is omitted.

In step S507, it is determined whether or not the optical disc 101 is a CD disc (i.e., a disc for which a start processing procedure is to be performed by using the infrared laser).

When an amplitude of the FE signal measured by the FE measurement section 117 is greater than or equal to a predetermined value, it is determined that the optical disc 101 is a CD disc. In this case, In step S508, the CD disc start table 131 is selected and a start processing procedure for a CD disc is performed. Herein, similarly to the DVD disc, the start processing procedure for the CD disc is substantially the same as that described above, and thus the description thereof is omitted.

At this stage, there is no possibility that the optical disc 101 is an existing optical disc which should be recorded or reproduced by using the red laser or the infrared laser such as a DVD disc or a CD disc. Thus, the blue laser is selected in step S509 and a disc determination processing using the blue laser is performed in step S510. The method for measuring the amplitude of the FE signal and the method for measuring the amplitude of the AS signal including the vertical movement of the focus actuator are similar to those by the blue laser described in Embodiment 1, and thus, the description thereof is omitted.

Similarly to Embodiment 1, when the disc determination processing using the blue laser is performed, if a single Blu-ray disc is irradiated with the blue laser at a laser power for a dual layer Blu-ray disc, recorded data may be destroyed (reproduction light degradation). Thus, all of the settings including the laser power are set to the settings for a single layer.

In step S511, if the amplitude of the normalized FE signal calculated by the normalization calculation section 136 is smaller than or equal to a predetermined value, the optical disc 101 is determined to be a disc other than the Blu-ray disc. In this case, the start processing procedure terminates with an error signal.

In step S512, if the amplitude of the FE signal measured by the FE amplitude measurement section 117 is greater than or equal to a predetermined value, the optical disc 101 is determined to be a single layer Blu-ray disc. In this case, step S513 and steps S515 to S522 are performed to complete the start processing procedure. Thereafter, a reproduction operation or a recording operation of the optical disc 101 is performed as necessary.

On the other hand, in step S512, if the amplitude of the FE signal measured by the FE amplitude measurement section 117 is smaller than or equal to the predetermined value, the optical disc 101 is determined to be a dual layer Blu-ray disc. In this case, a focus jump operation for moving the convergence point of the light beam from the information surface on which the focus control is currently performed to an adjacent information surface is performed after the processing from step S514 to step S520 is performed. Various adjustments are performed in steps S519 and S521 such that the best recording or reproduction operation for the information surface is achieved.

As described above, by temporarily selecting a laser other than the blue laser when a bare optical disc is mounted, and performing the disc determination processing by using the amplitude of the FE signal, it becomes possible to perform the start processing procedure in accordance with the type of the disc without destroying the recorded data by irradiation of the blue laser even in case where an existing optical disc which is recorded or reproduced by using a red laser or an infrared laser, such as a DVD disc or a CD disc, is mounted. Furthermore, it is possible to avoid destroying the recorded data by irradiating a single layer disc at the laser power for a dual layer disc by setting all the settings including a laser power to those for a single layer disc when the disc determination processing by using the blue laser is performed. It is also possible to determine whether or not the disc is mounted in the reversed state.

In the present embodiment, the red laser is first selected to determine whether or not the disc is a DVD disc, and then the infrared laser is selected to determine whether or not the disc is a CD disc. Similar effects can also be achieved by first selecting the infrared laser to determine whether or not the disc is a CD disc, and then selecting the red laser to determine whether or not the disc is a DVD disc.

In the above described embodiments, an optical disc is used as an example of an information medium. However, the present invention is not limited to this. Any medium which allows performing a recording operation and/or a reproduction operation may be used as an information medium.

The present invention has been described above with reference to the preferred embodiments. However, the present invention should not be limited to these. It is noted that the scope of the present invention should be construed only by the scope of the claims. It is also noted that those skilled in the art can readily implement the description of the present invention and an equivalent scope based on technical knowledge from the description of the preferred embodiments. It is noted that the patents, patent applications, and documents mentioned above are herein incorporated by reference through their entirety.

The optical disc apparatus according to the present invention has a disc determination method having a high reliability given by utilizing both a disc determination by a cartridge switch and a disc determination by light reflected by the optical disc. The optical disc apparatus is useful as a Blu-ray disc recorder including a blue laser. The application of the optical disc apparatus is not limited to a recorder but it is applicable to a PC drive and the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information medium apparatus for performing at least one of a recording operation and a reproduction operation for the information medium, comprising:
   a determination section for determining whether or not a cartridge for accommodating the information medium has been previously opened; and
   a control section for performing a start processing procedure corresponding to the information medium,
   wherein:
   when it is determined that the cartridge has not been previously opened, the control section performs a first start processing procedure for starting the information medium by using a blue laser, and
   when it is determined that the cartridge has been previously opened, the control section determines whether or not the information medium is an information medium for which a start processing procedure is to be performed by using a laser other than the blue laser.

2. An information medium apparatus according to claim 1, wherein:
   when it is determined that the information medium is an information medium for which a start processing procedure is to be performed by using a laser other than the blue laser, the control section performs a start processing procedure by using a laser other than the blue laser, and
   when it is determined that the information medium is not an information medium for which a start processing procedure is to be performed by using a laser other than the blue laser, the control section determines whether or not the information medium is accommodated in the cartridge in the correct way by using the blue laser.

3. An information medium apparatus according to claim 2, wherein:
   when it is determined that the information medium is accommodated in the cartridge in the correct way, the control section performs a second start processing procedure for starting the information medium by using the blue laser, and
   when it is determined that the information medium is not accommodated in the cartridge in the correct way, the control section outputs an error signal.

4. An information medium apparatus according to claim 1, wherein, in the first start processing procedure, the control section determines whether the information medium has a single layer structure or a multiple layer structure, and performs a start processing procedure in accordance with whether the information medium has a single layer structure or a multiple layer structure.

5. An information medium apparatus according to claim 3, wherein, in the second start processing procedure, the control section determines whether the information medium has a single layer structure, or a multiple layer structure by using the blue laser, and performs a start processing procedure in accordance with whether the information medium has a single layer structure or a multiple layer structure.

6. An information medium apparatus according to claim 5, wherein the control section determines whether the information medium has a single layer structure or a multiple layer structure in accordance with an amplitude of a focus error signal generated based on a light beam which is emitted from the blue laser and is reflected by the information medium.

7. An information medium apparatus according to claim 2, wherein the control section normalizes an amplitude of the focus error signal generated based on a light beam emitted from the blue laser and is reflected by the information medium with an amplitude of a total light intensity signal generated based on the laser beam emitted from the blue laser and is reflected by the information medium so as to generate a normalized focus error signal, and determines whether or not the information medium is accommodated in the cartridge in the correct way in accordance with the amplitude of the normalized focus error signal.

8. An information medium apparatus according to claim 7, wherein the control section stops rotating the information medium during measuring the amplitude of the focus error signal and the amplitude of the total light intensity signal.

9. An information medium apparatus according to claim 7, wherein the control section moves a convergence point of the light beam into a position which is away from the information medium, then measures an amplitude of the focus error signal and an amplitude of the total light intensity signal while gradually moving the convergence point of the light beam close to the information medium, and then moves the convergence point of the light beam away from the information medium after completing the measurement of the amplitude of the focus error signal and the amplitude of the total light intensity signal.

10. An information medium apparatus according to claim 2, wherein:
    the control section determines whether or not the information medium is an information medium for which a start processing procedure is to be performed by using a red laser, and
    when it is determined that the information medium is an information medium for which a start processing procedure is to be performed by using the red laser, the control section performs a start processing procedure corresponding to the information medium by using the red laser.

11. An information medium apparatus according to claim 10, wherein the control section determines whether or not the information medium is an information medium for which a start processing procedure is to be performed by using the red laser in accordance with an amplitude of a focus error signal generated based on a light beam which is emitted from the red laser and is reflected by the information medium.

12. An information medium apparatus according to claim 11, wherein the control section stops rotating the information medium during measuring the amplitude of the focus error signal.

13. An information medium apparatus according to claim 11, wherein the control section moves a convergence point of the light beam into a position which is away from the information medium, then measures an amplitude of the focus error signal while gradually moving the convergence point of the light beam close to the information medium, and then moves the convergence point of the light beam away from the information medium after completing the measurement of the amplitude of the focus error signal.

14. An information medium apparatus according to claim 10, wherein:
    when it is determined that the information medium is not an information medium for which a start processing procedure is to be performed by using the red laser, the control section determines whether or not the information medium is an information medium for which a start processing procedure is to be performed by using an infrared laser, and when it is determined that the information medium is an information medium for which a start processing procedure is to be performed by using the infrared laser, the control section performs a start processing procedure corresponding to the information medium by using the infrared laser.

15. An information medium apparatus according to claim 2, wherein:

the control section determines whether or not the information medium is an information medium for which a start processing procedure is to be performed by using an infrared laser, and when it is determined that the information medium is an information medium for which a start processing procedure is to be performed by using the infrared laser, the control section performs a start processing procedure corresponding to the information medium by using the infrared laser.

16. An information medium apparatus according to claim 15, wherein the control section determines whether or not the information medium is an information medium for which a start processing procedure is to be performed by using the infrared laser in accordance with an amplitude of a focus error signal generated based on a light beam which is emitted from the infrared laser and is reflected by the information medium.

17. An information medium apparatus according to claim 16, wherein the control section stops rotating the information medium during measuring the amplitude of the focus error signal.

18. An information medium apparatus according to claim 16, wherein the control section moves a convergence point of the light beam into a position which is away from the information medium, then measures an amplitude of the focus error signal while gradually moving the convergence point of the light beam close to the information medium, and then moves the convergence point of the light beam away from the information medium after completing the measurement of the amplitude of the focus error signal.

19. An information medium apparatus according to claim 15, wherein:

when it is determined that the information medium is not an information medium for which a start processing procedure is to be performed by using the infrared laser, the control section determines whether or not the information medium is an information medium for which a start processing procedure is to be performed by using a red laser, and when it is determined that the information medium is an information medium for which a start processing procedure is to be performed by using the red laser, the control section performs a start processing procedure corresponding to the information medium by using the red laser.

20. An information medium apparatus according to claim 1, wherein the control section determines whether or not the information medium is an information medium for which a start processing procedure is to be performed by using a laser other than the blue laser, when the information medium is a bare information medium which is not accommodated in any cartridge.

21. An information medium starting method which is performed in an information medium apparatus for performing at least one of a recording operation and a reproduction operation for the information medium, comprising the steps of:

(a) determining whether or not a cartridge for accommodating the information medium has been previously opened; and (b) performing a start processing procedure corresponding to the information medium, wherein the step (b) includes the steps of:

when it is determined that the cartridge has not been previously opened, performing a first start processing procedure for starting the information medium by using a blue laser; and when it is determined that the cartridge has been previously opened, determining whether or not the information medium is an information medium for which a start processing procedure is to be performed by using a laser other than the blue laser.

22. An information medium starting method according to claim 21, wherein the step (b) further includes the steps of:

when it is determined that the information medium is an information medium for which a start processing procedure is to be performed by using a laser other than the blue laser, performing a start processing procedure by using a laser other than the blue laser; and when it is determined that the information medium is not an information medium for which a start processing procedure is to be performed by using a laser other than the blue laser, determining whether or not the information medium is accommodated in the cartridge in the correct way by using the blue laser.

23. An information medium starting method according to claim 22, wherein the step (b) further includes the steps of:

when it is determined that the information medium is accommodated in the cartridge in the correct way, performing a second start processing procedure for starting the information medium by using the blue laser; and when it is determined that the information medium is not accommodated in the cartridge in the correct way, outputting an error signal.

24. An information medium starting method according to claim 21, wherein the first start processing procedure includes the steps of determining whether the information medium has a single layer structure or a multiple layer structure, and performing a start processing procedure in accordance with whether the information medium has a single layer structure or a multiple layer structure.

25. An information medium starting method according to claim 23, wherein the second start processing procedure includes the steps of determining whether the information medium has a single layer structure or a multiple layer structure by using the blue laser, and performing a start processing procedure in accordance with whether the information medium has a single layer structure or a multiple layer structure.

26. An information medium starting method according to claim 25, wherein the determination is made whether the information medium has a single layer structure or a multiple layer structure in accordance with an amplitude of a focus error signal generated based on a light beam which is emitted from the blue laser and is reflected by the information medium.

27. An information medium starting method according to claim 22, wherein the step (b) further includes the step of normalizing an amplitude of the focus error signal generated based on a light beam emitted from the blue laser and is reflected by the information medium with an amplitude of a total light intensity signal generated based on the laser beam emitted from the blue laser and is reflected by the information medium so as to generate a normalized focus error signal, and the determination is made whether or not the information medium is accommodated in the cartridge in the correct way in accordance with the amplitude of the normalized focus error signal.

28. An information medium starting method according to claim 27, wherein the step (b) further includes the step of stopping rotating of the information medium during measuring the amplitude of the focus error signal and the amplitude of the total light intensity signal.

29. An information medium starting method according to claim 27, wherein the step (b) further includes the steps of:
moving a convergence point of the light beam into a position which is away from the information medium;
then measuring an amplitude of the focus error signal and an amplitude of the total light intensity signal while gradually moving the convergence point of the light beam close to the information medium; and
then moving the convergence point of the light beam away from the information medium after completing the measurement of the amplitude of the focus error signal and the amplitude of the total light intensity signal.

30. An information medium starting method according to claim 22, wherein the step (b) further includes the steps of:
determining whether or not the information medium is an information medium for which a start processing procedure is to be performed by using a red laser; and
when it is determined that the information medium is an information medium for which a start processing procedure is to be performed by using the red laser, performing a start processing procedure corresponding to the information medium by using the red laser.

31. An information medium starting method according to claim 30, wherein the determination is made whether or not the information medium is an information medium for which a start processing procedure is to be performed by using the red laser in accordance with an amplitude of a focus error signal generated based on a light beam which is emitted from the red laser and is reflected by the information medium.

32. An information medium starting method according to claim 31, wherein the step (b) further includes the step of stopping rotating the information medium during measuring the amplitude of the focus error signal.

33. An information medium starting method according to claim 31, wherein the step (b) further includes the steps of:
moving a convergence point of the light beam into a position which is away from the information medium;
then measuring an amplitude of the focus error signal while gradually moving the convergence point of the light beam close to the information medium; and
then moving the convergence point of the light beam away from the information medium after completing the measurement of the amplitude of the focus error signal.

34. An information medium starting method according to claim 30, wherein the step (b) further includes the steps of:
when it is determined that the information medium is not an information medium for which a start processing procedure is to be performed by using the red laser, determining whether or not the information medium is an information medium for which a start processing procedure is to be performed by using an infrared laser; and
when it is determined that the information medium is an information medium for which a start processing procedure is to be performed by using the infrared laser, performing a start processing procedure corresponding to the information medium by using the infrared laser.

35. An information medium starting method according to claim 22, wherein the step (b) further Includes the steps of:
determining whether or not the information medium is an information medium for which a start processing procedure is to be performed by using an infrared laser; and
when it is determined that the information medium is an information medium for which a start processing procedure is to be performed by using the infrared laser, performing a start processing procedure corresponding to the information medium by using the infrared laser.

36. An information medium starting method according to claim 35, wherein the determination is made whether or not the information medium is an information medium for which a start processing procedure is to be performed by using the infrared laser in accordance with an amplitude of a focus error signal generated based on a light beam which is emitted from the infrared laser and is reflected by the information medium.

37. An information medium starting method according to claim 36, wherein the step (b) further includes the step of stopping rotating the information medium during measuring the amplitude of the focus error signal.

38. An information medium starting method according to claim 36, wherein the step (b) further includes the steps of:
moving a convergence point of the light beam into a position which is away from the information medium;
then measuring an amplitude of the focus error signal while gradually moving the convergence point of the light beam close to the information medium; and
then moving the convergence point of the light beam away from the information medium after completing the measurement of the amplitude of the focus error signal.

39. An information medium starting method according to claim 35, wherein the step (b) further includes the steps of:
when it is determined that the information medium is not an information medium for which a start processing procedure is to be performed by using the infrared laser, determining whether or not the information medium is an information medium for which a start processing procedure is to be performed by using a red laser; and
when it is determined that the information medium is an information medium for which a start processing procedure is to be performed by using the red laser, performing a start processing procedure corresponding to the information medium by using the red laser.

40. An information medium starting method according to claim 21, wherein the step (b) further includes the step of determining whether or not the information medium is an information medium for which a start processing procedure is to be performed by using a laser other than the blue laser, when the information medium is a bare information medium which is not accommodated in any cartridge.

* * * * *

UNITED STATES PATENT AND TRADEMARK OFFICE
CERTIFICATE OF CORRECTION

PATENT NO. : 7,345,961 B2
APPLICATION NO. : 10/972215
DATED : March 18, 2008
INVENTOR(S) : Takashi Kishimoto, Rie Takahashi and Katsuya Watanabe It is certified that error appears in the above-identified patent and that said Letters Patent is hereby corrected as shown below:

Column 15, line 60, "single layer structure, or a multiple layer structure" should read -- single layer structure or a multiple layer structure --.

Signed and Sealed this

Twenty-first Day of October, 2008

JON W. DUDAS
*Director of the United States Patent and Trademark Office*